(12) United States Patent
Wang et al.

(10) Patent No.: US 11,294,774 B2
(45) Date of Patent: Apr. 5, 2022

(54) METHOD FOR MANAGING BACKUP DATA ON FIRST, SECOND, OR THIRD VIRTUAL MACHINE MANAGEMENT PLATFORM

(71) Applicant: EMC IP Holding Company LLC, Hopkinton, MA (US)

(72) Inventors: Phoenix Yun Wang, Chengdu (CN); Rita Na Li, Chengdu (CN); Bing Bai, Chengdu (CN); Eric Qiang Ye, Chengdu (CN); Jing Wang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 277 days.

(21) Appl. No.: 16/724,662

(22) Filed: Dec. 23, 2019

(65) Prior Publication Data

US 2021/0019234 A1  Jan. 21, 2021

(30) Foreign Application Priority Data

Jul. 19, 2019 (CN) .......................... 201910656561.X

(51) Int. Cl.
*G06F 11/14* (2006.01)
*G06F 8/65* (2018.01)
*G06F 9/455* (2018.01)

(52) U.S. Cl.
CPC ............ *G06F 11/1464* (2013.01); *G06F 8/65* (2013.01); *G06F 9/45558* (2013.01); *G06F 11/1469* (2013.01); *G06F 2009/45595* (2013.01)

(58) Field of Classification Search
CPC .... G06F 11/1464; G06F 8/65; G06F 9/45558; G06F 11/1469
See application file for complete search history.

(56) References Cited

U.S. PATENT DOCUMENTS 9,292,327 B1 *  3/2016  von Thenen ........ G06F 11/1484
10,698,712 B2 *  6/2020  Reddy ..................... G06F 16/24
(Continued)

*Primary Examiner* — Tammara R Peyton
(74) *Attorney, Agent, or Firm* — Womble Bond Dickinson (US) LLP

(57) ABSTRACT

Embodiments of the present disclosure relate to a method, a device and a computer program product for managing backup data. The method comprises receiving a first request from a user for managing backup data on a first virtual machine management platform. The method further comprises sending a second request comprising a user identifier and a platform identifier to a backup server. The method further comprises receiving, from the backup server, a first virtual machine identifier of the first virtual machine used by the user on the second virtual machine management platform and backup records corresponding to the first virtual machine identifier. The method further comprises determining, based on the first virtual machine identifier, whether a second virtual machine matched with the first virtual machine is present in the first virtual machine management platform. The method further comprises, in response to the second virtual machine being present, storing the backup records in association with a second virtual machine identifier related to the second virtual machine. With the above method, it is possible to implement quick migration of backup data across platforms thereby providing a seamless, reliable and convenient data protection solution for the user.

20 Claims, 5 Drawing Sheets

(56) References Cited

U.S. PATENT DOCUMENTS

| | | | |
|---|---|---|---|
| 10,985,996 B2* | 4/2021 | Savov | H04L 41/5041 |
| 2013/0024862 A1* | 1/2013 | Lim | G06F 8/656 |
| | | | 718/1 |

* cited by examiner

METHOD FOR MANAGING BACKUP DATA ON FIRST, SECOND, OR THIRD VIRTUAL MACHINE MANAGEMENT PLATFORM

CROSS-REFERENCE TO RELATED APPLICATION

This patent application claims priority, under 35 U.S.C. § 119, of Chinese Patent Application No. 201910656561.X, filed Jul. 19, 2019, entitled "METHOD, DEVICE AND COMPUTER PROGRAM PRODUCT FOR MANAGING BACKUP DATA."

FIELD

Embodiments of the present disclosure relate to the field of data storage, and specifically to a method, an electronic device and a computer program product for managing backup data.

BACKGROUND

With rapid development of storage technology, a lot of data needs to be backed up to a backup storage device through a backup system. By backing up data to a backup storage device, the data becomes more secure. When data is damaged, the data may be recovered from the backup storage device through the backup system, thereby enhancing data security.

As cloud technologies develop, it becomes very common to use a virtual machine management platform to manage an operation of the virtual machine. When the virtual machine needs to back up its data, the data used in the virtual machine is backed up with a backup server related to the virtual machine management platform. However, there are still many problems to be solved when the backup data of the virtual machine is managed through the virtual machine management platform.

SUMMARY

Embodiments of the present disclosure provide a method, an electronic device and a computer program product for managing backup data.

In one aspect of the disclosure, there is provided a method of managing backup data. The method comprises receiving a first request from a user for managing backup data on a first virtual machine management platform, the backup data being backed up by the user through a second virtual machine management platform, the first request comprising a user identifier of the user and a platform identifier related to the second virtual machine management platform. The method further comprises sending a second request comprising the user identifier and the platform identifier to a backup server. The method further comprises receiving, from the backup server, a first virtual machine identifier of the first virtual machine used by the user on the second virtual machine management platform and backup records corresponding to the first virtual machine identifier. The method further comprises determining, based on the first virtual machine identifier, whether a second virtual machine matched with the first virtual machine is present in the first virtual machine management platform. The method further comprises, in response to the second virtual machine being present, storing the backup records in association with a second virtual machine identifier related to the second virtual machine to enable management of the backup data by the first virtual machine management platform.

According to a second aspect of the present disclosure, there is provided an electronic device. The electronic device comprises a processor; and a memory having computer program instructions stored thereon, the processor executing the computer program instructions in the memory to control the electronic device to perform acts, the acts comprising: receiving a first request from a user for managing backup data on a first virtual machine management platform, the backup data being backed up by the user through a second virtual machine management platform, the first request comprising a user identifier of the user and a platform identifier related to the second virtual machine management platform; sending a second request comprising the user identifier and the platform identifier to a backup server; receiving, from the backup server, a first virtual machine identifier of the first virtual machine used by the user on the second virtual machine management platform and backup records corresponding to the first virtual machine identifier; determining, based on the first virtual machine identifier, whether a second virtual machine matched with the first virtual machine is present in the first virtual machine management platform; and in response to the second virtual machine being present, storing the backup records in association with a second virtual machine identifier related to the second virtual machine to enable management of the backup data by the first virtual machine management platform.

According to a third aspect of the present disclosure, there is provided a computer program product that is tangibly stored on a non-volatile computer readable medium and comprises machine-executable instructions. The machine-executable instructions, when executed, cause a machine to perform steps of the method according to the first aspect of the present disclosure.

BRIEF DESCRIPTION OF THE DRAWINGS

The above and other features, advantages and aspects of embodiments of the present disclosure will be made more apparent by describing exemplary embodiments of the present disclosure in more detail with reference to figures. In the exemplary embodiments of the present disclosure, the same reference signs usually represent the same element, wherein.

In all figures, the same or corresponding reference signs represent the same or corresponding parts.

DETAILED DESCRIPTION OF EMBODIMENTS

Figure 1:
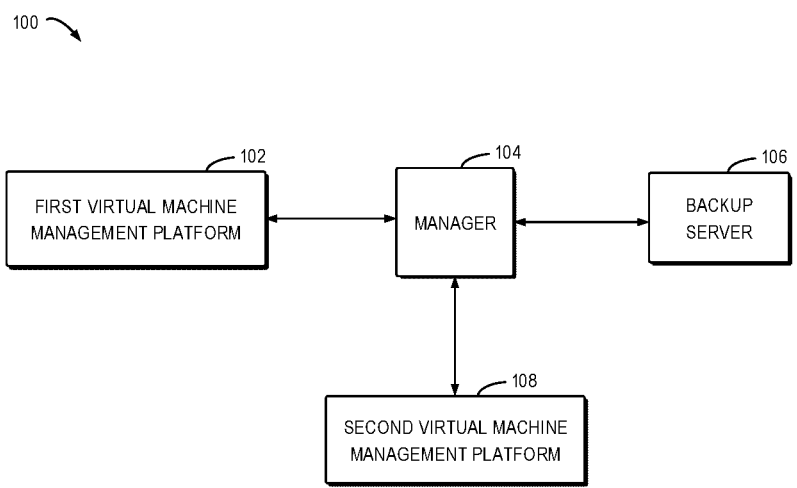
FIG. 1 illustrates a schematic diagram of an example environment 100 in which a device and/or method according to an embodiment of the present disclosure may be implemented.

Preferred embodiments of the present disclosure will be described below in more detail with reference to figures.

Although figures show preferred embodiments of the present disclosure, it should be appreciated that the present disclosure may be implemented in various forms and should not be limited by embodiments stated herein. On the contrary, these embodiments are provided to make the present disclosure more apparent and complete. It should be appreciated that figures and embodiments of the present disclosure are only used for exemplary purposes rather than limiting protection scope of the present disclosure.

As used herein, the term "includes" and its variants are to be read as open terms that mean "includes, but is not limited to." The term "based on" is to be read as "based at least in part on." The term "an implementation" is to be read as "at least one implementation." Terms "first" and "second" etc. may refer to different or identical objects. Other explicit and implicit definitions may also be included below.

Principles of the present disclosure are described below with reference to several exemplary embodiments illustrated in the drawings. Although preferred embodiments of the present invention have been shown in the drawings, it should be understood that these embodiments are only intended to enable those skilled in the art to better understand and thereby implementing the present disclosure, rather than limiting the scope of the present disclosure in any manner.

Normally, a virtual machine running on a virtual machine management platform needs to back up data on a backup server. For example, in a virtual machine management platform vSphere, the management platform manages virtual machines and actual physical devices available for the virtual machines. The virtual machines in the vSphere platform may back up the data and save the backed up data in the backup server.

However, upon upgrading an existing virtual machine management platform or updating a virtual machine management platform, the updated virtual machine management platform only manages virtual machines operating on the new platform and backup performed on the new virtual machine management platform. For example, the virtual machine is initially managed by a virtual machine management platform vSphere; after a new virtual machine management platform vCloud Director is deployed, the existing virtual machine will be imported into the vCloud Director and protected by a new data protection model designed for the vCloud Director. However, the upgraded virtual machine management platform or the new virtual machine management platform does not manage the data backed up on the previous virtual machine management platform. For example, since data protection model policies of the vSphere and the vCloud Director are different, it is impossible to manage, in the virtual machine management platform vCloud Director, the data backed up by the virtual machine in the virtual machine management platform vSphere, so that a user cannot obtain the previously backed up data, causing unsafety of the data.

In order to solve at least one technical problem of the above problems, the present disclosure proposes a solution for managing backup data. According to embodiments of the present disclosure, a virtual machine identifier and backup records of the previous first virtual machine are obtained from a backup server, and then it is determined whether the virtual machine is in a first and a second virtual machine management platforms based on the virtual machine identifier. If the virtual machine exists in both virtual machine management platforms and there is a correct organization mark on the first virtual machine management platform, this indicates that a second virtual machine matched with the first virtual machine exists in the first virtual machine management platform, and the identifier of the second virtual machine is stored in association with the backup records so that the second virtual machine management platform implements the management of the previously backed up data. Therefore, by migrating historical backup data across different architectures, a method of seamless data protection between two virtual machine management platforms (e.g., the first virtual machine management platform vCloud Director and the second virtual machine management platform vSphere) is provided so that a client may manage these backup data in the new virtual machine management platform.

FIG. 1 illustrates a schematic diagram of an example environment 100 in which a device and/or a method according to an embodiment of the present disclosure may be implemented.

As shown in FIG. 1, the example environment 100 includes a first virtual machine management platform 102 and a second virtual machine management platform 108. The first virtual machine management platform 102 is used to manage a plurality of virtual machines, and it may manage different virtual machines for different users, or may also set different rights for different users or virtual machines. In one example, the first virtual machine platform 102 may be a vCloud Director in which the virtual machines may have different hierarchical identifiers, for example, organization identifiers or department identifiers to which the virtual machine belongs.

The second virtual machine management platform 108 is used to manage the virtual machines and physical machines for implementing the virtual machines. In one example, the second virtual machine management platform 108 may be a vSphere in which various virtual machines and physical machines implementing the virtual machines may be managed by a Vcenter.

The example environment 100 further includes a backup server 106. When the second virtual machine management platform 108 is used, the backup server 106 is used to back up data generated by the virtual machines in the second virtual machine management platform 108. Upon the second virtual machine management platform 108 is upgraded to the first virtual machine management platform 102, the backup server 106 manages the data backed up by the virtual machine in the first virtual machine management platform 102.

The example environment 100 further includes a manager 104. The manager 104 is used to implement presentation of the data backed up by the virtual machine in the second virtual machine management platform 108 to the virtual machine in the first virtual machine management platform 102, so that the first virtual machine management platform 102 manages data backed up by users via the second virtual machine management platform 108 before.

In some embodiments, when the manager 104 receives a request from a user to obtain data backed up on the second virtual machine management platform 108, the manager 104 queries the backup server 106 for the virtual machine identifier of the first virtual machine and backup records corresponding to the virtual machine identifier, wherein the user has ever performed data backup on the second virtual machine management platform 108 by the first virtual machine. Then, the manager 104 sends a request to the second virtual machine management platform 108 based on the virtual machine identifier obtained from the backup server 106 to determine whether the virtual machine corresponding to the virtual machine identifier is on the virtual machine management platform.

If a third virtual machine identifier corresponding to the first virtual machine and indicating the first virtual machine on the second virtual machine management platform 108 is obtained from the second virtual machine management platform 108, then the manager 104 sends the obtained third virtual machine identifier to the first virtual machine management platform 102. The first virtual machine management platform 102 determines whether a virtual machine corresponding to the third virtual machine identifier is present. If the virtual machine is present, it is determined whether the hierarchical identifier of the virtual machine is valid. If valid, it indicates that a second virtual machine that matches the first virtual machine is found. Then, the identifier of the second virtual machine in the first virtual machine management platform 102 is recorded in association with the backup records to enable management of the previous backup data by the second virtual machine platform.

In some embodiments, the determined backup records associated with the virtual machine may be presented to a user so that the user manages previously backed up data. When the second virtual machine corresponding to the virtual machine identifier in the backup server is not found, virtual machine description information may be generated based on the backup records, and then an administrator adds a corresponding level identifier by manager, and then the backup records are stored in association with the virtual machine description information and the added level identifier.

In some embodiments, if there is no the first virtual machine identifier and its backup records which are matched with the second virtual machine, the manager 104 may send a message to the user to ask a user whether to restore the virtual machine corresponding to the first virtual machine identifier and backup records, and restore the virtual machine and allocate a corresponding virtual machine identifier after the user confirms. In some embodiments, the manager 104 sends an indication directly to the second virtual machine management platform 108 to restore the virtual machine.

The FIG. 1 above illustrates a schematic diagram of an example environment 100 in which a device and/or a method according to an embodiment of the present disclosure may be implemented. A process of a method 200 for managing backup data according to an embodiment of the present disclosure is described in detail below with reference to FIG. 2.

Figure 2:
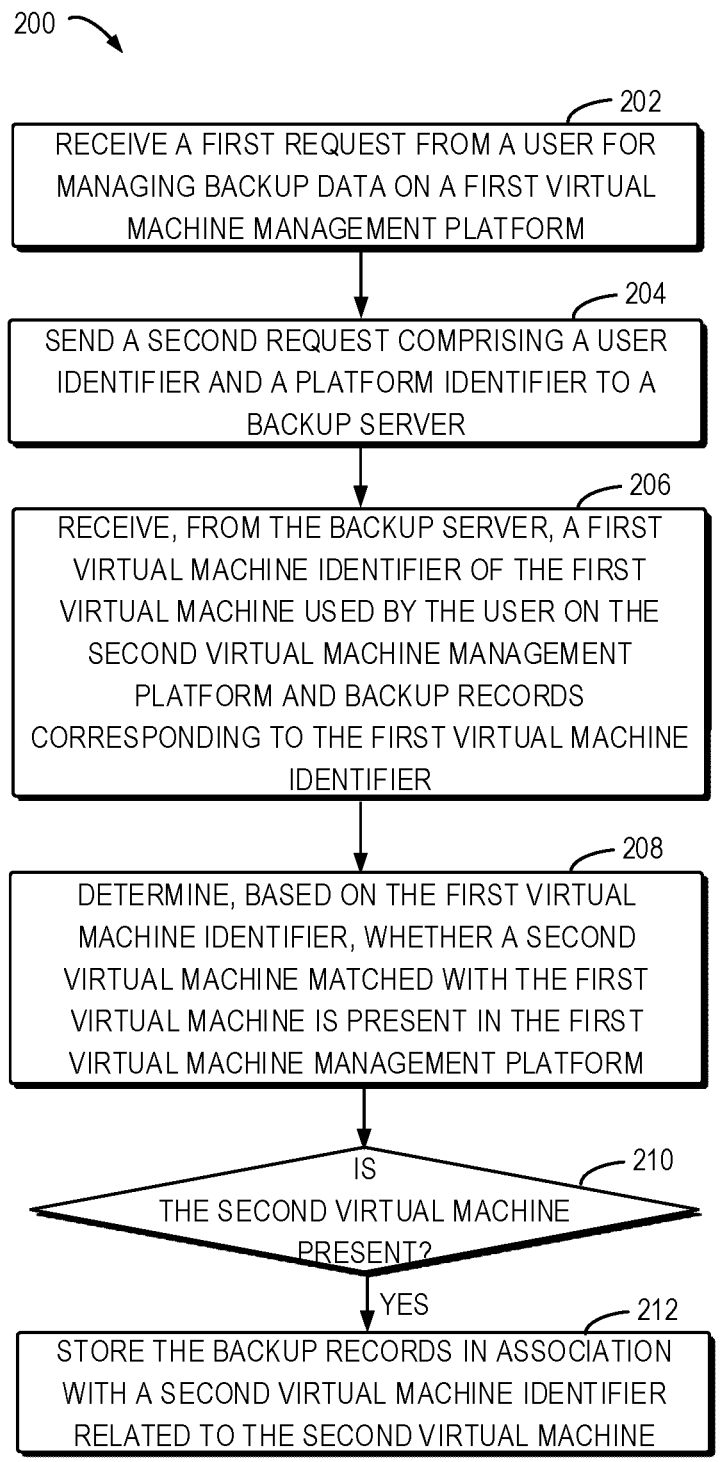
FIG. 2 illustrates a flow chart of a method 200 of managing backup data according to an embodiment of the present disclosure.

As shown in FIG. 2, at block 202, the manager receives a first request from a user for managing backup data on a first virtual machine management platform, where the backup data is backed up by the user through the second virtual machine management platform. The first request includes a user's user identifier and a platform identifier related to the second virtual machine management platform. For example, the manager 104 in FIG. 1 receives a request from a user. The request is used for asking for management of data backed up by the user through a virtual machine on the second virtual machine management platform 108, on the first virtual machine management platform 102. The received user's request includes a user identifier and an identifier related to the second virtual machine management platform 108 (e.g., a Vcenter identifier in a virtual machine management platform vSphere).

In some embodiments, the first virtual machine management platform is generated by upgrading the second virtual machine management platform.

At block 204, the manager sends, to a backup server, a second request including the user identifier and the platform identifier. For example, as shown in FIG. 1, in order to determine which virtual machines in the second virtual machine platform 108 related to the user have backed up the data and which data have been backed up, the manager 104 sends a request to the backup server 106, where the request includes the user identifier and the identifier of the second virtual machine management platform 108.

At block 206, the manager receives, from the backup server, a first virtual machine identifier of the first virtual machine used by the user on the second virtual machine management platform and a backup records corresponding to the first virtual machine identifier. For example, as shown in FIG. 1, upon obtaining the user's identifier and the identifier of the second virtual machine management platform 108, the backup server 106 looks up for the virtual machine identifier of the virtual machine related to the user's identifier and the identifier of the second virtual machine management platform 108, and the backup records corresponding to the virtual machine identifier. Then, the manager 104 receives the above information from the backup server 106.

In some embodiments, the backup server stores information such as the user's identifier, the identifier of the virtual machine management platform related to the user, the virtual machine identifier of the virtual machine that has ever backed up the data on the virtual machine management platform, and the backup records corresponding to the virtual machine identifier. Alternatively or additionally, the backup records also include virtual machine description information, such as an operating system running on the virtual machine, a size of memory of the virtual machine, and the like.

At block 208, the manager determines, based on the first virtual machine identifier, whether a second virtual machine matched with the first virtual machine is present in the first virtual machine management platform. For example, in FIG. 1, the manager 104 determines, based on the first virtual machine identifier obtained from the backup server 106, whether a second virtual machine matched with the first virtual machine is present in the first virtual machine management platform 102. A process of determining whether a second virtual machine matched with the first virtual machine is present in the first virtual machine management platform will be described in detail with reference to FIG. 3.

At block 210, the manager determines whether the second virtual machine is present. Upon determining that the second virtual machine is present, at block 212, the manager stores the backup records in association with the second virtual machine identifier related to the second virtual machine to enable management of the backup data by the first virtual machine management platform.

Figure 4:
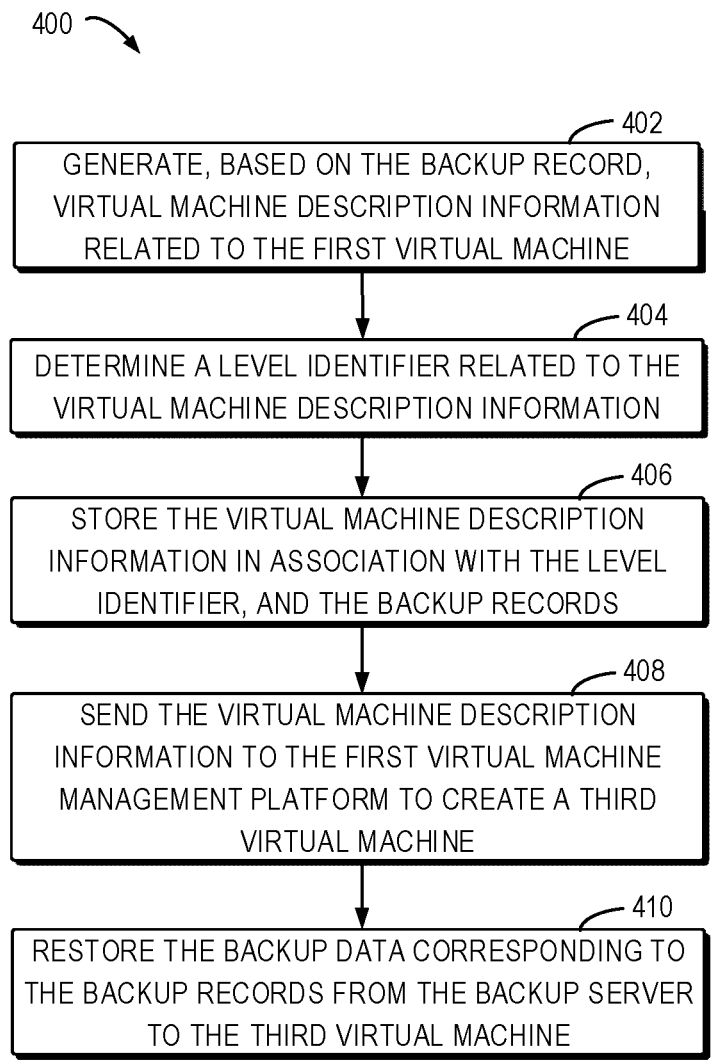
FIG. 4 illustrates a flow chart of a method 400 of managing backup data when a second virtual machine is not present according to an embodiment of the present disclosure.

If it is determined that the second virtual machine is no present, the obtained backup records are stored in a storage device related to the manager, which will be described in detail below with reference to FIG. 4 (for the purpose of simplicity, FIG. 2 does not show the "NO" branch).

With the above method, it is possible to quickly implement migration of historical backup data across different architectures of two virtual machine management platforms, thereby providing a seamless, reliable and convenient data protection solution for user and facilitating the user managing data backed up in the previous virtual machine management platform, in a new virtual machine management platform.

Figure 3:
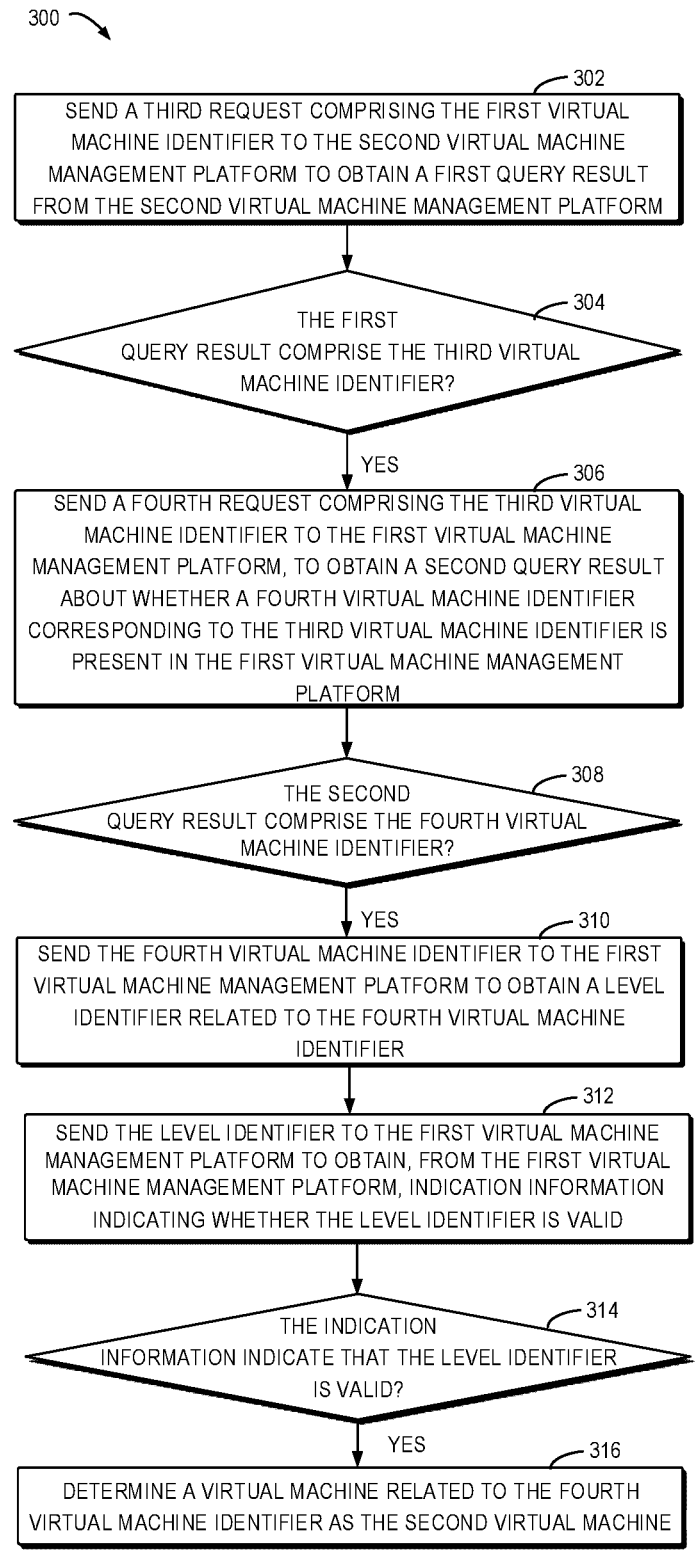
FIG. 3 illustrates a flow chart of a method 300 of determining a second virtual machine according to an embodiment of the present disclosure.

The flow chart of the method 200 of managing backup data in accordance with an embodiment of the present disclosure is described above with reference to FIG. 2. The process for determining whether a second virtual machine matched with the first virtual machine is present in the second virtual machine management platform in block 208 of FIG. 2 is described below with reference to FIG. 3. FIG. 3 illustrates a flow chart of a method 300 of determining a second virtual machine according to an embodiment of the present disclosure.

As shown in FIG. 3, at block 302, a manager sends a third request including the first virtual machine identifier to the second virtual machine management platform to obtain a first query result from the first virtual machine management platform, where a first query result may be used to determine whether a third virtual machine identifier corresponding to the first virtual machine identifier is present in the second virtual machine management platform, wherein the third virtual machine identifier indicates that the second virtual machine management platform has the first virtual machine. For example, the manager 104 in FIG. 1 sends a request for querying the virtual machine to the second virtual machine management platform 108, where the request includes the first virtual machine identifier obtained from the backup server 106. Upon receiving the request, the second virtual machine management platform 108 queries whether the virtual machine is present in the second virtual machine management platform 108 through the first virtual machine identifier. Then, the second virtual machine management platform 108 returns a query result to the manager 104.

In some embodiments, the virtual machine present in the second virtual machine management platform has a third virtual identifier (e.g., a virtual machine reference) related to the virtual machine management platform. The third virtual machine identifier is stored in association with the first virtual machine identifier in the second virtual machine management platform, and the third virtual machine identifier may be present in the first virtual machine management platform and the second virtual machine management platform.

In some embodiments, in the second virtual machine management platform, the third virtual machine identifier has a mapping relationship with the first virtual machine identifier, a virtual machine establishment time, the resources allocated for the virtual machine.

At block 304, the manager determines whether the first query result includes the third virtual machine identifier. For example, in FIG. 1, upon receiving the query result, the manager 104 determines whether the query result includes the third virtual machine identifier. When the query result does not include the third virtual machine identifier (a "NO" branch is not shown in FIG. 3 for the sake of simplicity), it is believed that the second virtual machine matched with the first virtual machine is not present in the first virtual machine management platform 102.

When the query result includes the third virtual machine identifier, at block 306, the manager sends the first virtual machine management platform a fourth request including the third virtual machine identifier to obtain a second query result about whether a fourth virtual machine identifier corresponding to the third virtual machine identifier is present in the first virtual machine management platform. For example, in FIG. 1, when the manager 104 determines that the third virtual machine identifier corresponding to the first virtual machine identifier is included in the query result, this indicates that the first virtual machine is present in the second virtual machine management platform 108. Then, the manager 104 sends the third virtual machine identifier to the first virtual machine management platform 102 to look up whether a virtual machine corresponding to the first virtual machine is present, that is, whether a fourth virtual machine identifier corresponding to the third virtual machine identifier is found, where the fourth virtual machine identifier corresponds to the virtual machine in the second virtual machine platform. After the lookup is complete, the first virtual machine management platform 102 sends the query result to the manager 104.

At block 308, the manager determines whether the second query result includes the fourth virtual machine identifier. When the second query result does not include the fourth virtual machine identifier (FIG. 3 does not show a "NO" branch for the sake of simplicity), this indicates that the second virtual machine matched with the first virtual machine is not present in the first virtual machine management platform.

When the second query result includes the fourth virtual machine identifier, at block 310, the manager sends the fourth virtual machine identifier to the first virtual machine management platform to obtain a level identifier related to the fourth virtual machine identifier.

In some embodiments, the level identifier indicates a level to which the fourth virtual machine belongs, for example, which organization or which department the virtual machine corresponding to the fourth virtual machine identifier is assigned to.

At block 312, the manager sends the level identifier to the first virtual machine management platform to obtain, from the first virtual machine management platform, indication information indicating whether the level identifier is valid. The manager sends the level identifier to the first virtual machine management platform. The first virtual machine management platform determines whether the level identifier is valid, and then sends the indication information indicating whether the level identifier is valid to the manager.

In some embodiments, the level includes an organization and a department. The level identifier is determined as being valid only when both the organization identifier and the department identifier are valid. In some embodiments, a user may set the level identifier to be valid in any suitable manner as needed. For example, only the department identifier is valid or only the organization identifier is valid. The above examples are only intended to describe the present disclosure, rather than limiting to the scope of the present disclosure.

At block 314, the manager determines whether the indication information indicates that the level identifier is valid. When the indication information indicates that the level identifier is invalid (FIG. 3 does not show a "NO" branch for the sake of simplicity), it is determined that the second virtual machine matched with the first virtual machine is not present in the first virtual machine management platform. When the indication information indicates that the level identifier is valid, at block 316, the virtual machine related to the fourth virtual machine identifier is determined as the second virtual machine.

Through the foregoing method, it is possible to quickly determine that the second virtual machine matched with the first virtual machine is present in the first virtual machine management platform, thereby providing users with accurate backup data having a corresponding relationship, and ensuring that the backed up data is safe and reliable.

The flow chart of the method 300 of determining the second virtual machine is described above with reference to FIG. 3. A flow chart of a method 400 of managing backup data when the second virtual machine is not present according to an embodiment of the present disclosure will be described in detail below with reference to FIG. 4.

When the manager determines that the second virtual machine matched with the first virtual machine is not present in the first virtual machine management platform, at block 402, the manager generates, based on the backup records, virtual machine description information related to the first virtual machine. For example, in FIG. 1, the manager 104 determines that the second virtual machine corresponding to the first virtual machine in the backup server 106 is not present in the first virtual machine management platform, and then the manager 104 may generate the virtual machine description information based on the backup records obtained from the backup server 106.

At block 404, the manager may determine a level identifier related to the virtual machine description information. When the second virtual machine is not present, regarding an absence of the backup records of the corresponding second virtual machine, a level identifier may be assigned thereto through a first virtual machine platform administrator or a user. For example, in FIG. 1, manager 104 determines a level identifier added for the backup records, for example, assigns an organization and a department thereto.

At block 406, the manager may store the virtual machine description information in association with the level identifier and the backup records. In order to facilitate managing the backup records of the virtual machine that does not exist in the first virtual machine management platform, the manager stores information such as the backup records obtained from the backup server in association with the virtual machine description information and the level identifier. The acts in blocks 408 and 410 below may be performed when a user wants to restore the virtual machine related to the backup records.

At block 408, the manager may send the virtual machine description information to the first virtual machine management platform to create a third virtual machine. In some embodiments, the manager may send a message to the user to ask the user to confirm whether to create the third virtual machine in the first virtual machine management platform. The third virtual machine is created in the first virtual machine management platform after the user confirms. In some embodiments, the manager may send a message to the first virtual machine management platform to create the third virtual machine directly in the third virtual machine management platform. The above examples are only intended to describe the present disclosure rather than limiting the scope of the present disclosure.

At block 410, the manager may restore backup data corresponding to the backup records from the backup server to the third virtual machine. After restoring to the third virtual machine, the manager also stores, into the third virtual machine, the backup data related to the first virtual machine in the backup server to facilitate a user processing the backed up data through the third virtual machine.

Through the above method, it is possible to, in the absence of the virtual machine; generate the virtual machine for the backup data for the user to achieve management of backup data thereby improving safety of data.

Figure 5:
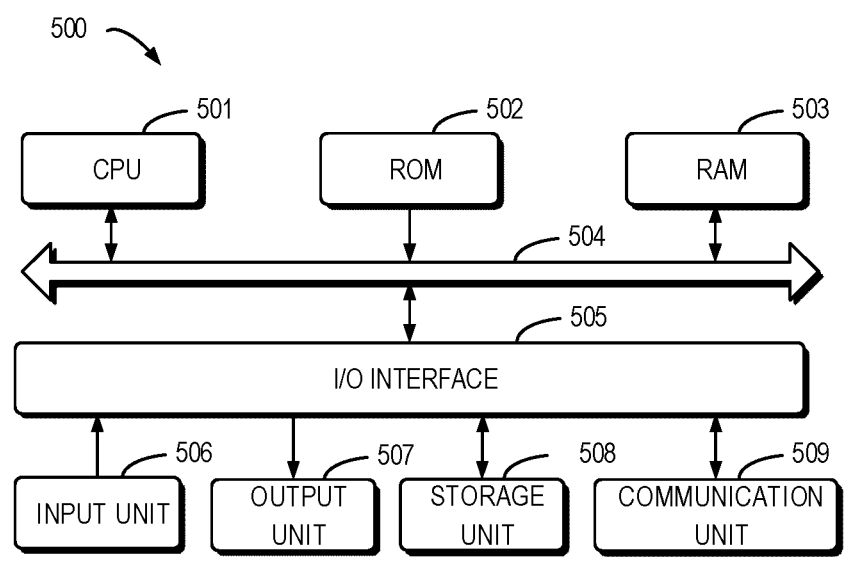
FIG. 5 illustrates a schematic block diagram of an example device 500 adapted to implement an embodiment of the present disclosure.

FIG. 5 illustrates a schematic block diagram of an example device 500 that may be used to implement an embodiment of the content of the present disclosure. For example, any one of 102, 104, 106 and 108 shown in FIG. 1 may be implemented by the device 500. As depicted, the device 500 includes a central processing unit (CPU) 501 which is capable of performing various proper actions and processes in accordance with a computer program instruction stored in a read only memory (ROM) 502 or a computer program instruction loaded from a storage unit 508 to a random access memory (RAM) 503. Various programs and data needed in the operation of the device 500 may also be stored in the RAM 503. The CPU 501, the ROM 502 and the RAM 503 are connected to one another via a bus 504. An input/output (I/O) interface 505 is also connected to the bus 504.

The following components in the device 500 are connected to the I/O interface 505: an input unit 506 including a keyboard, a mouse, or the like; an output unit 507, e.g., various displays and loudspeakers; a storage unit 508 such as a magnetic disk, an optical disk or the like; and a communication unit 509 such as a network card, a modem, a radio communication transceiver. The communication unit 509 allows the device 500 to exchange information/data with other devices via a computer network such as Internet and/or various telecommunication networks.

The above-described procedures and processes such as methods 200, 300 and 400 may be implemented by the processing unit 501. For example, in some embodiments, the methods 200, 300 and 400 may be implemented as a computer software program, which is tangibly included in a machine-readable medium such as the storage unit 508. In some embodiments, part or the entire computer program may be loaded and/or installed on the device 500 via the ROM 502 and/or the communication unit 509. When the computer program is uploaded to the RAM 503 and executed by the CPU 501, one or more acts of the above methods 200, 300 and 400 may be implemented.

The present disclosure may be a method, a device, a system and/or a computer program product. The computer program product may include a computer readable storage medium (or media) having computer readable program instructions thereon for carrying out aspects of the present disclosure.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing devices.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, devices (systems), and computer program products according to embodiments of the present disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, a segment, or a portion of code, which includes one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing backup data, comprising:
   receiving a first request from a user for managing backup data on a first virtual machine management platform, the backup data being backed up by the user through a second virtual machine management platform, the first request comprising a user identifier of the user and a platform identifier related to the second virtual machine management platform;
   sending a second request comprising the user identifier and the platform identifier to a backup server;
   receiving, from the backup server, a first virtual machine identifier of a first virtual machine used by the user on the second virtual machine management platform and backup records corresponding to the first virtual machine identifier;
   determining, based on the first virtual machine identifier, whether a second virtual machine matched with the first virtual machine is present in the first virtual machine management platform; and
   in response to the second virtual machine being present, storing the backup records in association with a second virtual machine identifier related to the second virtual machine to enable management of the backup data by the first virtual machine management platform.

2. The method according to claim 1, wherein determining whether a second virtual machine matched with the first virtual machine is present in the first virtual machine management platform comprises:

sending a third request comprising the first virtual machine identifier to the second virtual machine management platform to obtain a first query result from the second virtual machine management platform, the first query result being used to determine whether a third virtual machine identifier corresponding to the first virtual machine identifier is present in the second virtual machine management platform, the third virtual machine identifier indicating that the second virtual machine management platform has the first virtual machine; and in response to the first query result comprising the third virtual machine identifier, determining, based on the third virtual machine identifier, whether the second virtual machine matched with the first virtual machine is present in the first virtual machine management platform.

3. The method according to claim 2, wherein determining, based on the third virtual machine identifier, whether the second virtual machine matched with the first virtual machine is present in the first virtual machine management platform comprises:

sending a fourth request comprising the third virtual machine identifier to the first virtual machine management platform, to obtain a second query result about whether a fourth virtual machine identifier corresponding to the third virtual machine identifier is present in the first virtual machine management platform;

in response to the second query result comprising the fourth virtual machine identifier, sending the fourth virtual machine identifier to the first virtual machine management platform to obtain a level identifier related to the fourth virtual machine identifier, the level identifier indicating a level to which a fourth virtual machine belongs;

sending the level identifier to the first virtual machine management platform to obtain, from the first virtual machine management platform, indication information indicating whether the level identifier is valid; and in response to the indication information indicating that the level identifier is valid, determining a virtual machine related to the fourth virtual machine identifier as the second virtual machine.

4. The method according to claim 2, wherein determining whether a second virtual machine matched with the first virtual machine is present in the first virtual machine management platform further comprises:

in response to the first query result not comprising the third virtual machine identifier, determining that the second virtual machine matched with the first virtual machine is not present in the first virtual machine management platform.

5. The method according to claim 3, wherein determining, based on the third virtual machine identifier, whether the second virtual machine matched with the first virtual machine is present in the first virtual machine management platform further comprises:

in response to the second query result not comprising the fourth virtual machine identifier, determining that the second virtual machine matched with the first virtual machine is not present in the first virtual machine management platform.

6. The method according to claim 3, wherein determining, based on the third virtual machine identifier, whether the second virtual machine matched with the first virtual machine is present in the first virtual machine management platform further comprises:

in response to the indication information indicating that the level identifier is invalid, determining that the second virtual machine matched with the first virtual machine is not present in the first virtual machine management platform.

7. The method according to claim 1, further comprising:
in response to the second virtual machine being not present,
generating, based on the backup records, virtual machine description information related to the first virtual machine;
determining a level identifier related to the virtual machine description information; and
storing the virtual machine description information in association with the level identifier and the backup records.

8. The method according to claim 7, further comprising:
sending the virtual machine description information to the first virtual machine management platform to create a third virtual machine; and
restoring the backup data corresponding to the backup records from the backup server to the third virtual machine.

9. The method according to claim 1, wherein the first virtual machine management platform is generated by upgrading the second virtual machine management platform.

10. An electronic device, the electronic device comprising:
a processor; and
a memory having computer program instructions stored thereon, the processor executing the computer program instructions in the memory to control the electronic device to perform acts comprising:
receiving a first request from a user for managing backup data on a first virtual machine management platform, the backup data being backed up by the user through a second virtual machine management platform, the first request comprising a user identifier of the user and a platform identifier related to the second virtual machine management platform;
sending a second request comprising the user identifier and the platform identifier to a backup server;
receiving, from the backup server, a first virtual machine identifier of a first virtual machine used by the user on the second virtual machine management platform and backup records corresponding to the first virtual machine identifier;
determining, based on the first virtual machine identifier, whether a second virtual machine matched with the first virtual machine is present in the first virtual machine management platform; and
in response to the second virtual machine being present, storing the backup records in association with a second virtual machine identifier related to the second virtual machine to enable management of the backup data by the first virtual machine management platform.

11. The electronic device according to claim 10, wherein determining whether a second virtual machine matched with the first virtual machine is present in the first virtual machine management platform comprises:

sending a third request comprising the first virtual machine identifier to the second virtual machine management platform to obtain a first query result from the second virtual machine management platform, the first query result being used to determine whether a third virtual machine identifier corresponding to the first virtual machine identifier is present in the second virtual machine management platform, the third virtual machine identifier indicating that the second virtual machine management platform has the first virtual machine; and in response to the first query result comprising the third virtual machine identifier, determining, based on the third virtual machine identifier, whether the second virtual machine matched with the first virtual machine is present in the first virtual machine management platform.

12. The electronic device according to claim 11, wherein determining, based on the third virtual machine identifier, whether the second virtual machine matched with the first virtual machine is present in the first virtual machine management platform comprises:

sending a fourth request comprising the third virtual machine identifier to the first virtual machine management platform, to obtain a second query result about whether a fourth virtual machine identifier corresponding to the third virtual machine identifier is present in the first virtual machine management platform;

in response to the second query result comprising the fourth virtual machine identifier, sending the fourth virtual machine identifier to the first virtual machine management platform to obtain a level identifier related to the fourth virtual machine identifier, the level identifier indicating a level to which a fourth virtual machine belongs;

sending the level identifier to the first virtual machine management platform to obtain, from the first virtual machine management platform, indication information indicating whether the level identifier is valid; and in response to the indication information indicating that the level identifier is valid, determining a virtual machine related to the fourth virtual machine identifier as the second virtual machine.

13. The electronic device according to claim 11, wherein determining whether a second virtual machine matched with the first virtual machine is present in the first virtual machine management platform further comprises:

in response to the first query result not comprising the third virtual machine identifier, determining that the second virtual machine matched with the first virtual machine is not present in the first virtual machine management platform.

14. The electronic device according to claim 12, wherein determining, based on the third virtual machine identifier, whether the second virtual machine matched with the first virtual machine is present in the first virtual machine management platform further comprises:

in response to the second query result not comprising the fourth virtual machine identifier, determining that the second virtual machine matched with the first virtual machine is not present in the first virtual machine management platform.

15. The electronic device according to claim 12, wherein determining, based on the third virtual machine identifier, whether the second virtual machine matched with the first virtual machine is present in the first virtual machine management platform further comprises:

in response to the indication information indicating that the level identifier is invalid, determining that the second virtual machine matched with the first virtual machine is not present in the first virtual machine management platform.

16. The electronic device according to claim 10, the acts further comprising:

in response to the second virtual machine being not present,
generating, based on the backup records, virtual machine description information related to the first virtual machine;
determining a level identifier related to the virtual machine description information; and
storing the virtual machine description information in association with the level identifier and the backup records.

17. The electronic device according to claim 16, the acts further comprising:

sending the virtual machine description information to the first virtual machine management platform to create a third virtual machine; and
restoring the backup data corresponding to the backup records from the backup server to the third virtual machine.

18. The electronic device according to claim 10, wherein the first virtual machine management platform is generated by upgrading the second virtual machine management platform.

19. A computer program product being tangibly stored on a non-volatile computer-readable medium and comprising machine-executable instructions which, when executed, cause a machine to perform operations, the operations comprising:

receiving a first request from a user for managing backup data on a first virtual machine management platform, the backup data being backed up by the user through a second virtual machine management platform, the first request comprising a user identifier of the user and a platform identifier related to the second virtual machine management platform;

sending a second request comprising the user identifier and the platform identifier to a backup server;

receiving, from the backup server, a first virtual machine identifier of a first virtual machine used by the user on the second virtual machine management platform and backup records corresponding to the first virtual machine identifier;

determining, based on the first virtual machine identifier, whether a second virtual machine matched with the first virtual machine is present in the first virtual machine management platform; and in response to the second virtual machine being present, storing the backup records in association with a second virtual machine identifier related to the second virtual machine to enable management of the backup data by the first virtual machine management platform.

20. The computer program product according to claim 19, wherein determining whether a second virtual machine matched with the first virtual machine is present in the first virtual machine management platform comprises:

sending a third request comprising the first virtual machine identifier to the second virtual machine management platform to obtain a first query result from the second virtual machine management platform, the first query result being used to determine whether a third virtual machine identifier corresponding to the first virtual machine identifier is present in the second virtual machine management platform, the third virtual machine identifier indicating that the second virtual machine management platform has the first virtual machine; and in response to the first query result comprising the third virtual machine identifier, determining, based on the third virtual machine identifier, whether the second virtual machine matched with the first virtual machine is present in the first virtual machine management platform.

* * * * *